UNITED STATES PATENT OFFICE.

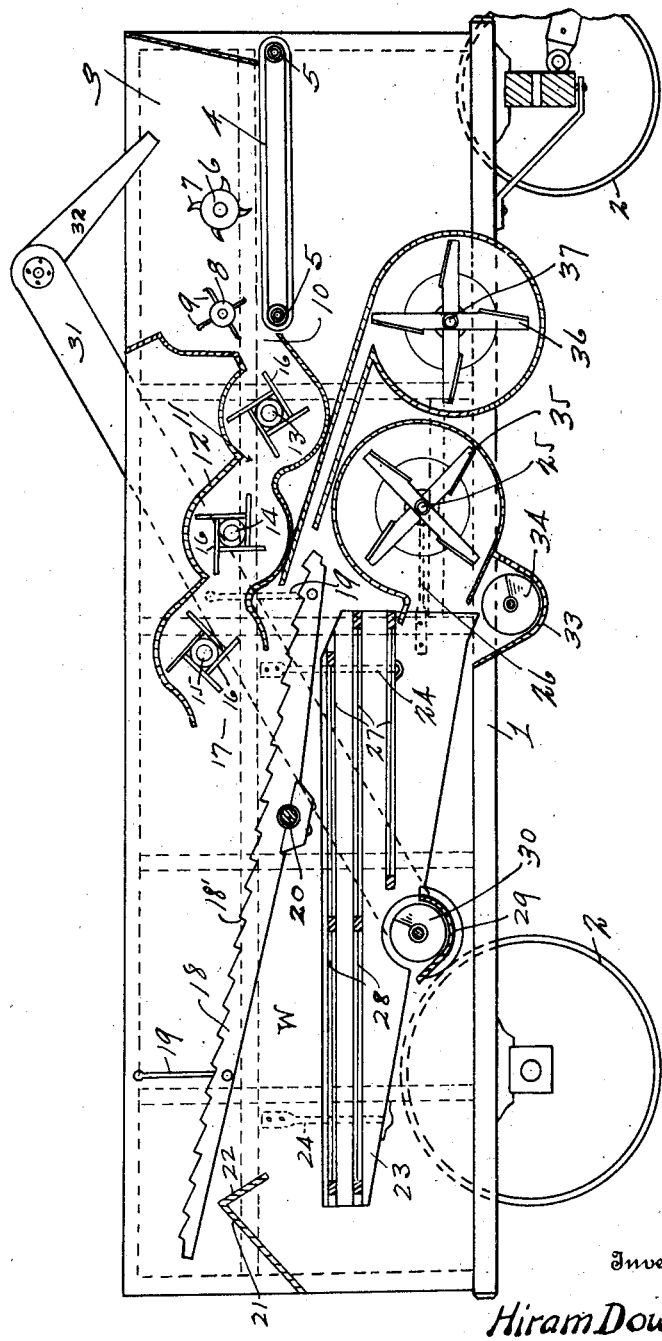

HIRAM DOWNING, OF SPOKANE, WASHINGTON.

GRAIN SEPARATOR.

1,405,766.    Specification of Letters Patent.    Patented Feb. 7, 1922.

Application filed May 19, 1919. Serial No. 298,175.

*To all whom it may concern:*

Be it known that I, HIRAM DOWNING, a citizen of the United States, residing at Spokane, in the county of Spokane and State of Washington, have invented certain new and useful Improvements in Grain Separators, of which the following is a specification.

The present invention relates to improvements in grain separators forming part of the well known type of machines for threshing grains from the straw, and the primary object of the invention is to eliminate some of the objectionable features of the present day method of threshing, and effect the threshing and separation of the grain from the straw by beating and throwing the grain, rather than by stripping. As now utilized the invention provides a compactly arranged, comparatively inexpensive machine, simple in its construction and operation, for separating the grain from the straw in a clean and workman like manner.

In the accompanying drawings I have illustrated one complete example of the physical embodiment of my invention, constructed and arranged according to the best mode I have so far devised for the practical application of the principles of my invention.

The drawing illustrates a single figure, showing a longitudinal vertical sectional view of the threshing machine involving the separating devices by means of which the clean grain, the tailings, and the straw are disposed of in quick and effectual manner.

The usual vehicle 1 on its wheels 2 of the typical threshing machine are utilized, and the straw is fed to the separator through the feed hopper 3 at the front of the implement, the hopper being provided with a movable floor or bottom in the form of an endless belt 4 suitably driven and passing over the spaced rollers 5, 5.

The feed hopper is located at the upper, front end of the implement, and when the material is fed thereto in bundles, the revolving roller 6, located transversely of the hopper, with its knives 7 projecting therefrom, cuts the bundle as it passes thereunder and the straw is moved in the direction of the arrow to the high speed picker roll 8 with its picker fingers 9 which loosen and lighten the straw or material as it passes through the throat 10 to the beating chamber 11.

The beating chamber is formed within the housing 12 and includes three communicating and transversely arranged cylindrical compartments for the accommodation of the three cylinders 13, 14 and 15 in the respective compartments, whose blades 16 also perform the function of fans, in addition to beating the straw to loosen the grain therefrom as it passes through the beating chamber and finally out through the outlet end 17 of the chamber.

Approximately the rear, upper half of the implement is occupied by the oscillating straw rack or carrier 18, which is swung from the wall of the machine by sets of pivotal hangers 19 arranged in pairs to suspend the carrier so that its toothed frame bars 18' may be oscillated by the action of the operating shaft 20 to shove the straw, step by step, to the rear after it has been received on the carrier from the beating chamber outlet 17. The action of the carrier gradually works the straw to the rear of the implement and it falls upon the deflecting board 21 which passes the straw to the stacker or carrier that is usually attached to the rear of the separator, and is common to nearly all types of threshing machines.

A grain deflecting board 22, is also used in conjunction with the straw deflecting board, which deflects any grains that may reach the rear end of the carrier before falling therethrough and guides them back into the well W, for further treatment.

Within the well W and below the carrier is located the vibrating shoe 23 in position to receive the grain as it falls through the carrier, and suspended on four pivotal hangers 24 similar to those of the carrier, and the shoe is vibrated or reciprocated from the shaft 25 (suitable driven) through the eccentric connecting rod 26.

Two sizes of dividing screens are employed in the shoe, the forward one indicated at 27 being of fine mesh, and the rear screen 28 being of coarser mesh, and the fine screen is arranged in three tiers while the coarser screen is used in two tiers, so that the grain falling on the top tier of the fine screen, and too large to pass through will be passed back to the coarser screen. Grain carrying husks and improperly threshed particles, too large to pass through the fine screens will be passed on to the cleaning screens 28, and passing therethrough will be gathered in the trough or chute 29 and returned as tailings, by the screw conveyer 30 to the elevator 31, and will be fed back through the nozzle 32 into the feed hopper for further treatment and worked over.

The clean grain falls through the fine screen 27 and is gathered in the trough 33, and then by means of the screw conveyer 34 is carried to the sacks or elevator by which it is delivered from the machine.

The operation of separation of the grain from the straw is aided by means of the wind blast from the fan 35 on shaft 25, which directs air currents through the vibrator or shoe, and an auxiliary fan 36 on shaft 37, directs an air blast over the carrier, which is of sufficient pressure to lift the straw, but will not interfere with the passage of the grain through the carrier.

The operating parts of the machine are driven from the same prime motor as usual, and while the operating parts and connections have not been illustrated herein, they will readily be understood by any one versed in the art, and it is believed from the above description taken in connection with the drawings a full, clear, and exact understanding of the invention and its meritorious features will be obtainable.

What I claim is—

The combination with an open end housing comprising successive, communicating chambers and a beating cylinder in each chamber, of an oscillatable carrier and a blower fan for directing an air blast between the housing and carrier, a vibrating shoe comprising a plurality of screens of various sizes beneath the carrier, said screens being arranged in vertical alinement, a conveyer intermediate of the shoe for disposing of the tailings, a conveyer at the forward end of the shoe for disposing of the grain, and a blower fan for said screens.

In testimony whereof I affix my signature.

HIRAM DOWNING.